US009880936B2

United States Patent
Athalye et al.

(10) Patent No.: US 9,880,936 B2
(45) Date of Patent: Jan. 30, 2018

(54) DISTRIBUTED CACHE FRAMEWORK (71) Applicants: Pranav Athalye, Pune (IN); Srinivas Sudhakaran, Pune (IN)

(72) Inventors: Pranav Athalye, Pune (IN); Srinivas Sudhakaran, Pune (IN)

(73) Assignee: Sybase, Inc., Dublin, CA (US)

( * ) Notice: Subject to any disclaimer, the term of this patent is extended or adjusted under 35 U.S.C. 154(b) by 89 days.

(21) Appl. No.: 14/519,971

(22) Filed: Oct. 21, 2014

(65) Prior Publication Data

US 2016/0110284 A1 Apr. 21, 2016

(51) Int. Cl.
*G06F 12/08* (2016.01)
*G06F 17/30* (2006.01)
*G06Q 10/06* (2012.01)
*G06F 12/084* (2016.01)

(52) U.S. Cl.
CPC ...... *G06F 12/084* (2013.01); *G06F 17/30477* (2013.01); *G06Q 10/067* (2013.01); *G06F 2212/163* (2013.01); *G06F 2212/284* (2013.01)

(58) Field of Classification Search
CPC .. G06F 12/084; G06F 17/30; G06F 17/30477; G06F 12/08; G06Q 10/067
See application file for complete search history.

(56) References Cited

U.S. PATENT DOCUMENTS

| | | | |
|---|---|---|---|
| 7,418,560 B2 | 8/2008 | Wintergerst | |
| 7,694,065 B2 | 4/2010 | Petev et al. | |
| 7,996,615 B2 | 8/2011 | Galchev et al. | |
| 9,137,210 B1* | 9/2015 | Joglekar | H04L 63/20 |
| 2005/0149907 A1* | 7/2005 | Seitz | G06F 9/5016 717/108 |
| 2010/0293337 A1* | 11/2010 | Murphy | G06F 12/0866 711/136 |
| 2011/0258391 A1* | 10/2011 | Atkisson | G06F 11/108 711/118 |
| 2013/0173569 A1* | 7/2013 | Pearcy | G06F 17/30 707/706 |
| 2014/0136791 A1 | 5/2014 | Fabijancic | |
| 2014/0351294 A1* | 11/2014 | Kumano | G06F 17/30312 707/812 |
| 2015/0127501 A1* | 5/2015 | Peters | G06Q 40/12 705/30 |
| 2015/0278923 A1* | 10/2015 | Vasantham | G06Q 50/01 705/26.81 |

\* cited by examiner

*Primary Examiner* — Ann J Lo
*Assistant Examiner* — Masud Khan
(74) *Attorney, Agent, or Firm* — Brake Hughes Bellermann LLP (57) ABSTRACT

A system includes a database that stores data on one or more memory devices and a business object layer that receives a request for data associated with a user stored on the database. The system includes a first cache that reads and stores the requested data from the database in response to the request from the business object layer, where the first cache is partitioned into different segments and the different segments are stored across multiple different computing devices. The system includes a second cache that reads and stores the requested data from the first cache. The business object layer filters and applies business logic to the data before the second cache reads the requested data from the first cache. The second cache is stored on a single computing device that received the request. The business object layer delivers the requested data from the second cache.

19 Claims, 5 Drawing Sheets

Online Banking

SYSTEM   REPORTS

System

Data Consolidator • Bank Lookup • Configuration

Data Retention   Opt-In Settings   Restrictions   Schedules   Channels   Cache (402)
Cache List                                                                                      (408/410) (404)

| Name | Server | Size(Entri... | MaxSize | Last Reset | Hit Ratio | Status | Enabl... | Clear |
|---|---|---|---|---|---|---|---|---|
| cache_DChist... | [(23):10.72.1... | 62(0.62%) | 10000 | NA | 69.55% | Enabled | Disable | 🗑 |
| cache_ProfileBi... | [(23):10.72.1... | 4(4.0%) | 100 | NA | 100.00% | Enabled | Disable | 🗑 |
| cache_Message... | [(23):10.72.1... | 13(13.0%) | 100 | NA | 61.42% | Enabled | Disable | 🗑 |
| cache_AccSer... | [(23):10.72.1... | 5(5.0%) | 100 | NA | 99.84% | Enabled | Disable | 🗑 |
| cache_tempTr... | [(23):10.72.1... | 4(0.0%) | 214748... | NA | 92.96% | Enabled | Disable | 🗑 |
| cache_ACH7O... | [(23):10.72.1... | 0(0.0%) | 100 | NA | 78.43% | Enabled | Disable | 🗑 |
| cache_ACH7C... | [(23):10.72.1... | 0(0.0%) | 100 | NA | 96.42% | Enabled | Disable | 🗑 |
| cache_Transfer... | [(23):10.72.1... | 0(0.0%) | 100 | NA | 66.42% | Enabled | Disable | 🗑 |
| cache_WireTe... | [(23):10.72.1... | 0(0.0%) | 100 | NA | 0.00% | Enabled | Disable | 🗑 |
| cache_ACH7P... | [(23):10.72.1... | 0(0.0%) | 100 | NA | 0.00% | Enabled | Disable | 🗑 |
| cache_WireBen... | [(23):10.72.1... | 0(0.0%) | 100 | NA | 68.15% | Enabled | Disable | 🗑 |
| cache_DCAcco... | [(23):10.72.1... | 12(1.2%) | 1000 | NA | 38.57% | Enabled | Disable | 🗑 |
| cache_BillPay11 | [(23):10.72.1... | 5(5.0%) | 100 | NA | 88.08% | Enabled | Disable | 🗑 |
| cache_Positive... | [(23):10.72.1... | 1(1.0%) | 100 | NA | 94.30% | Enabled | Disable | 🗑 |
| cache_Secure... | [(23):10.72.1... | 16(0.0%) | 214748... | NA | 67.72% | Enabled | Disable | 🗑 |

< 1 2 >

⟳ Refresh

DISTRIBUTED CACHE FRAMEWORK

TECHNICAL FIELD

This description relates to a distributed cache framework.

BACKGROUND

A platform for a system may support many thousands of concurrent user logins and the platform may read a large number of data items from a database repeatedly, including multiple fetches of data from the database by the same user. The existing architecture of the system may hamper performance, including increased response times to deliver requested data to user, such that the user experience may be degraded.

SUMMARY

According to one general aspect, a system includes a database that stores data on one or more memory devices and a business object layer that receives a request for data associated with a user stored on the database. The system includes a first cache that reads and stores the requested data from the database in response to the request from the business object layer, where the first cache is partitioned into different segments and the different segments are stored across multiple different computing devices. The system includes a second cache that reads and stores the requested data from the first cache. The business object layer filters and applies business logic to the data before the second cache reads the requested data from the first cache. The second cache is stored on a single computing device that received the request. The business object layer delivers the requested data from the second cache.

In another general aspect, a computer-implemented method includes receiving a request for data associated with a user stored on a database, reading the requested data from the database and storing the requested data in a first cache, where the first cache is partitioned into different segments and the different segments are stored across multiple different computing devices. The method includes reading the requested data from the first cache and storing the requested data in a second cache, where the second cache is stored on a single computing device. The method includes filtering and applying business logic to the requested data before storing the data in the second cache and delivering the requested data.

Implementations may include one or more of the following features. For example, the second cache may provide a mechanism to sort and page data in requested order.

In another general aspect, a computer program product is tangibly embodied on a non-transitory computer-readable storage medium and includes instructions that, when executed, are configured to cause at least one processor to receive a request for data associated with a user stored on the database, read the requested data from the database and store the requested data in a first cache, where the first cache is partitioned into different segments and the different segments are stored across multiple different computing devices. The requested data is from the first cache and stored in a second cache, where the second cache is stored on a single computing device. The instructions cause the at least one processor to filter and apply business logic to the requested data before storing the data in the second cache, deliver the requested data, receive subsequent requests for the data associated with the user, read the requested data from the second cache and deliver the requested data in response to the subsequent requests without accessing the data from the database.

The details of one or more implementations are set forth in the accompanying drawings and the description below. Other features will be apparent from the description and drawings, and from the claims.

DETAILED DESCRIPTION

Figure 1:
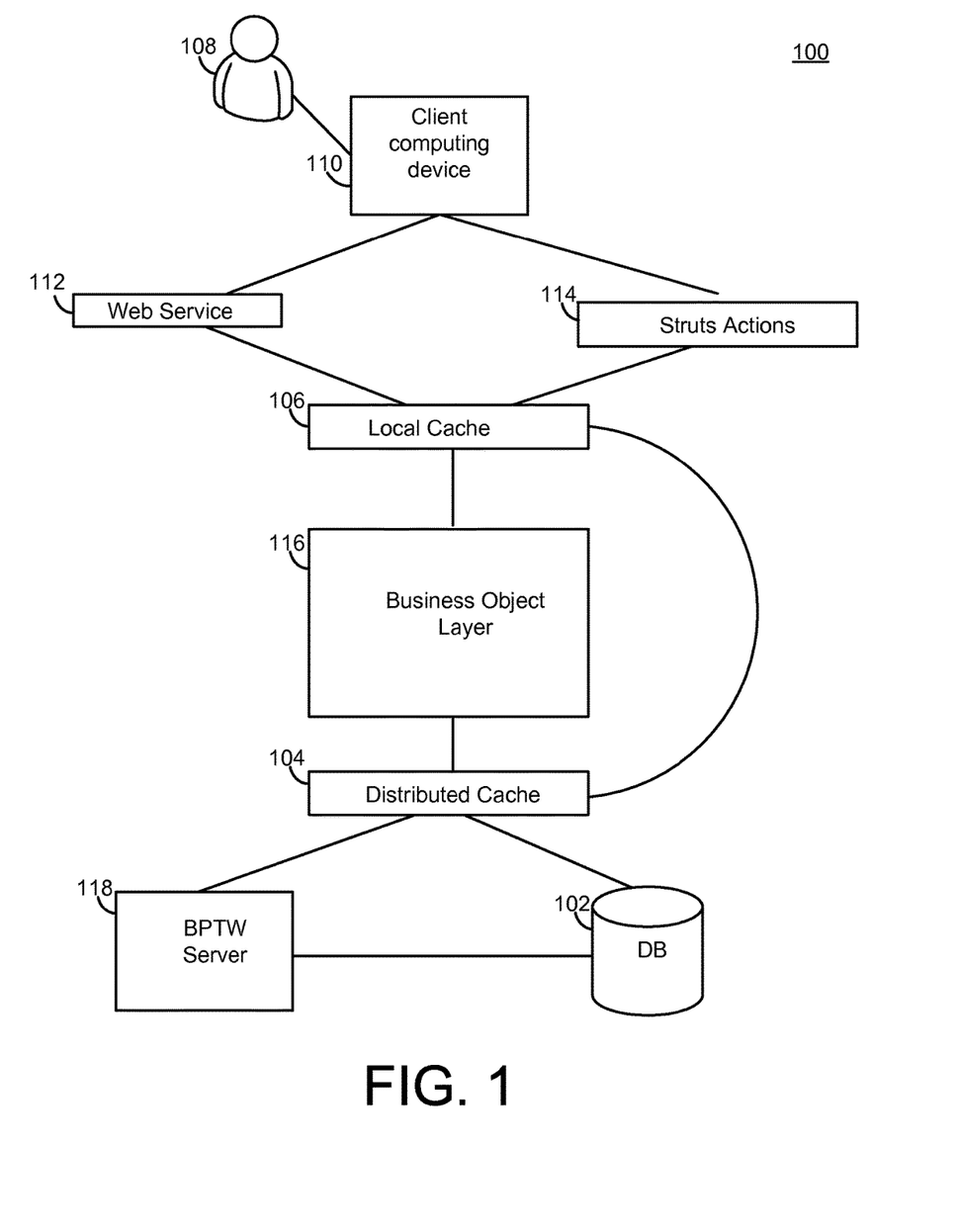
FIG. 1 is an example block diagram of a system for a distributed cache framework.

FIG. 1 is an example block diagram of a system 100 for a distributed cache framework. The system 100 includes a database 102 that is configured to store data for access by multiple different users. The database 102 may support multiple concurrent user logins by different users and allow data to be read from and written to the database 102. The database 102 be any type of database including, for example, a relational database, a columnar database, an in-memory database or any other type of database.

The system 100, including the database 102, may be used in different types of industries such as, for instance, the banking industry, the financial services industry, the airline industry, and many other various business and corporate industries. The system is scalable to enable many multiple users simultaneous login to read data from the database 102 and to write data to the database 102.

Data that is repeatedly read (or fetched) from the database 102 is cached to reduce database and networks trips and to prevent the database 102 from overloading with data requests. Caching the requested data, as described in more detail below with respect to the system 100, may result in better throughput, improved turnaround time and more optimal use of hardware resources. Data requested from the database 102 may be stored using both a distributed cache 104 and a local cache 106. The requested data may first be read from the database 102 and stored in the distributed cache 104, where the distributed cache 104 may provide high availability, fault tolerance and data reliability. The requested data may be read from the distributed cache 104 and stored in the local cache 106. The local cache 106 may provide a single copy of the requested data and store it on a single computing device. The local cache 106 may benefit the requesting user and be particular as to the requesting user.

Both the distributed cache 104 and the local cache 106 may be transparent to other aspects of the system 100 such that other components and implementations of other components may be changed without affecting the use of the distributed cache 104 and the local cache 106. The caches may be controlled using a cache services module (not shown in FIG. 1), which may function to control various operations of the caches, including being able to enable and disable a particular cache in real time (also known as on the fly).

The system 100 may use a two-tier architecture for the distributed cache 104 and the local cache 106. In one implementation, the system 100 uses hypertext transfer protocol (HTTP) requests for communications between the components of the system 100. It is understood that other protocols also may be used.

The distributed cache 104 (also referred to as the "first cache" in this document) may reside at the database layer. The distributed cache 104 may be partitioned into different segments and the different segments may be stored across multiple different computing devices. The distributed cache 104 may store data that is common and/or may be read and accessed by multiple related users such as, for example, users from a same entity such as the same business entity. The data stored in the distributed cache 104 may be backed up such that at least a second copy of the data is available in a different segment of the distributed cache 104, where the segment with the backup copy is stored on a different computing device.

The local cache 106 (also referred to as the "second cache" in this document) may reside at a business object layer. The local cache 106 may obtain its data from the distributed cache 104 and not from the database 102. In this manner, only one of the tiers in the two-tier cache architecture, namely the distributed cache 104, accesses the database 102 directly. In one example implementation, the local cache 106 is volatile and stores read-only data, which may be a subset of the data stored in the distributed cache 104. The local cache 106 may drop data at any point safely because the data is available from other sources including the distributed cache 104 and the database 102. If requested data is not found in the local cache 106, then the data is fetched from the distributed cache 104 and put into the local cache 106.

Also, the data in the local cache 106 may be specific to the particular user who requested the data (e.g., consistent with access rights to the requested data). The local cache 106 may support searching, sorting, paging, filtering and other operations on the data stored in the local cache 106 as may be requested by a user. The local cache 106 may reside on a single computing device and it may be created on the computing device that received the request for the data. The data in the local cache 106 may include the user's private data, which may not be common to other users.

Requests for data may come from different users using different computing devices and different communication channels (or channels). Even a single user may use different computing devices and different communication channels to request data, which may include performing transactions with respect to the requested data across multiple computing devices used to request the data. FIG. 1 illustrates a user 108 using a computing device 110. It is understood that the user 108 may represent many multiple different users and the computing device 110 may represent many multiple different computing devices used by the multiple different users.

The user 108 may use the computing device 110 to request data from the database 102. Depending on the type of computing device and/or the type of application used on the computing device 110, the request may be made using one of multiple different communication channels (or channels). For example, the user may use a web browser on a computing device, an application on a mobile computing device, a desktop application on a desktop or laptop computing device or through SMS communications, where each of these different access means may use one or more different communication channels.

The system 100 includes multiple interfaces to handle incoming requests and outgoing communication of data from the user 108 and the computing device 110 using different communication channels. For example, the system 100 includes a web service module 112 and a struts actions module 114. The web service module 112 is configured to process requests from a web service, such as web services that may be used with an application on a mobile computing device. Web service requests may be initiated from other types of computing devices as well. The struts actions module 114 is configured to process requests from browser-based applications and/or desktop applications.

In this manner, the system 100 may be referred to as an omni-channel system since it is capable of responding to requests received using different channels. Also, the two-tiered cache architecture using the distributed cache 104 and the local cache 106 enables transactional integrity for requests and transactions that occur by a single user using multiple different channels. For example, a transaction that is started using a web service may be continued without loss of data using a browser-based application. As discussed in more detail below, such a transaction may be stored in the distributed cache 104 until the transaction is indicated as being completed at which time the transaction may be committed to the database 102.

The system 100 also includes a business object layer 116 and a Bill Payment Transfer Warehouse (BPTW) server 118. The business object layer 116 is configured to receive requests for data stored on the database 102. The requests for data may be associated with a particular user. As will be discussed in more detail below, the business object layer 116 may include an interceptor and a handler for intercepting the requests to the database 102 and a handler for processing the requests to include using the distributed cache 104 and the local cache 106, as appropriate.

The business object layer 116 may be instantiated on multiple different computing devices such as, for example, multiple different servers, where the servers may be in communication with one another using a network such as a local area network (LAN) or a wide area network (WAN). Each of the computing devices on which the business object layer 116 is instantiated also may be referred to as a node.

The BPTW server 118 may be configured as a scheduler to process transactions that are related to a specific period of time, such as a specific date. The BPTW server 118 may function as a transaction store. The BPTW server 118 may process transactions, including batch transactions and/or backend transactions, and directly interface with the database 102. In one example implementation, the BPTW server 118 may be used where the system 100 in implemented in a banking platform.

The business object layer 116 may receive requests from the different channels including from the web service module 112 and the struts action module 114. For example, a request from the user 108 using computing device 110 may be received through either the web service module 112 or the struts action module 114. When data is first requested, the data is read from the database 102 and stored in the distributed cache 104.

The distributed cache 104 is implemented on multiple different computing devices and may be implemented on the same nodes as the business object layer 116. The data in the distributed cache 104 may be on the same node (e.g., server instance) as the business object layer 116. The distributed cache 104 may not perform operations on the data fetched from the database 102. The data in the distributed cache 104 may be stored in internal server format. That is, the database data format may be converted into server data format by a database adapter. In one example implementation, the distributed cache 104 is implemented using a distributed map that partitions and stores the data in the distributed cache 104 across multiple different computing devices. The distributed cache 104 may be configured using XML files. Each of the distributed cache 104 partitions may have a unique identifier associated with it on the computing device (or node) on which it resides.

In one example, a Hazelcast distributed map is used. In other implementations, other distributed maps may be used. The underlying distributed map structure for the distributed cache 104 may be changed without disrupting the overall operation of the system 100. That is, the underlying distributed cache structure or cache storage mechanism is independent of the overall system 100 framework.

The distributed cache 104 may be configured to read and store data from the database 102 in response to data requests on a per business basis. In some implementations, the distributed cache 104 does not change often and therefore it may be retained for long durations for the benefit of users simultaneously using an application to request data.

In one example implementation in the banking platform context, the distributed cache 104 may be used to cache data requests related to business accounts, wire payees, wire templates, ACH payees, ACH template, bill pay payees, messages and other information. For example, upon server start-up, a new distributed map may be created and defined on the server, including defining and setting the configuration parameters. The map definitions may be included in a file such as beans_hazelcast.xml, which are read by Hazelcast. The cache service may build cache objects to encapsulate the maps. When a new request for data is received, the request is routed for fulfillment to the distributed cache 104. If the data is not present in the distributed cache 104, then the distributed cache 104 fetches the data from the database 102. An interceptor, which is configured at server start-up in the beans_hazelcast.xml file, may be defined such that subsequent requests for data present in the distributed cache 104 may be routed appropriately such that the data does not need to be requested again from the database 102. The interceptor may handle the distributed cache 104 related logic such that it is possible to turn off the distributed cache 104 by removing the interceptor.

The local cache 106 reads the requested data from the distributed cache 104 and stores the requested data in the local cache 106. The local cache 106 may reside in the business object layer 116 and may not read the data directly from the database 102. In this manner, the business object layer 116 may filter and apply business logic rules to the data before the local cache 106 reads and stores the requested data from the distributed cache 104.

The filtering and business logic rules applied by the business object layer 116 helps enable that the data requested by the user is appropriate for the user, for instance, in terms of user authorized access to the data. The data fetched and stored in the local cache 106 may be stored as read-only data and serve as a private copy of the requested data for the requesting user. This eliminates the need to use a session to store a user's objects and provides statelessness. That is, in contrast to HTTP sessions, which provide statefullness, the use of the distributed cache 104 and the local cache 106 eliminates the need to maintain state information that would otherwise be needed if HTTP sessions were being used.

The local cache 106 may be instantiated and created on the same computing device or node that received the incoming request. The local cache 106 may be stored in local memory on this computing device. The local cache 106 may be deleted after a configurable period of time. Also, when a user logs out of an application on the computing device 110 that is used to request and access the data, the local cache 106 may be deleted. The data on the distributed cache 106 may be maintained for a longer period of time than the data on the local cache 104.

When a change occurs to the database 102, the distributed cache 104 may invalidate itself and the local cache 106, where the invalidation of the local cache 106 may be implemented using notification messages. Additionally, the distributed cache 104 and the local cache 106 may use notification messages to remain synchronized. A notification mechanism may be used to send messages to all of the computing devices or nodes having a distributed cache and/or a local cache.

The requested data stored in the local cache 106 may be delivered and presented to the user 108 on a user interface on the computing device 110 in different formats. In one example format, the requested data is presented in a grid that shows the data in columns. The data in the columns allows for paging, sorting and searching operations to be performed on the data in the local cache 106. The sorting, paging and searching operations are independent of the specific data type.

Subsequent requests for the data from the user 108 using the computing device 110 may be directed directly to the distributed cache 104 and/or the local cache 106. This includes subsequent requests received using the same channel as the original request or a different channel from the original request. In this manner, the subsequent requests for the data may be fulfilled by the distributed cache 104 and/or the local cache 106 without accessing the data from the database 102 because the data was already previously fetched from the database 102 in response to the first or the original request.

Data consistency between the database 102 and the distributed cache 104 is achieved using a lock mechanism. Data consistency between the distributed cache 104 and the local cache 106 is achieved using notifications. The lock mechanism keeps the distributed cache 104 synchronized with the database 102. Each cache uses a single lock mechanism. For example, if there is an update to a record in the database 102 and the record is present or absent in the caches, then the caches take an exclusive write lock on the cache while the database update is performed. If the record is present in the cache, then the cache containing the updated record may be invalidated and the lock on the cache is released.

The lock mechanism may include using a distributed shared (S) and exclusive lock (X). The distributed lock allows threads to lock the cache for read or write operations. Each thread must first request for a shared or exclusive lock and only after acquiring it can it access the cache. The lock is non-reentrant and processes requests in first-in-first-out (FIFO) manner, where a preference is given to writer threads.

In one implementations, the distributed cache 104 may be used to maintain transactional integrity and persistence during a transaction. For example, the user may input data for eventual storage in the database 102. The input data may first be written and stored in the distributed cache 104 and maintained in the distributed cache 104 until the transaction is completed and a submit signal has been received from the user. In this manner, the entered data is persistent until the transaction is completed.

Figure 2:
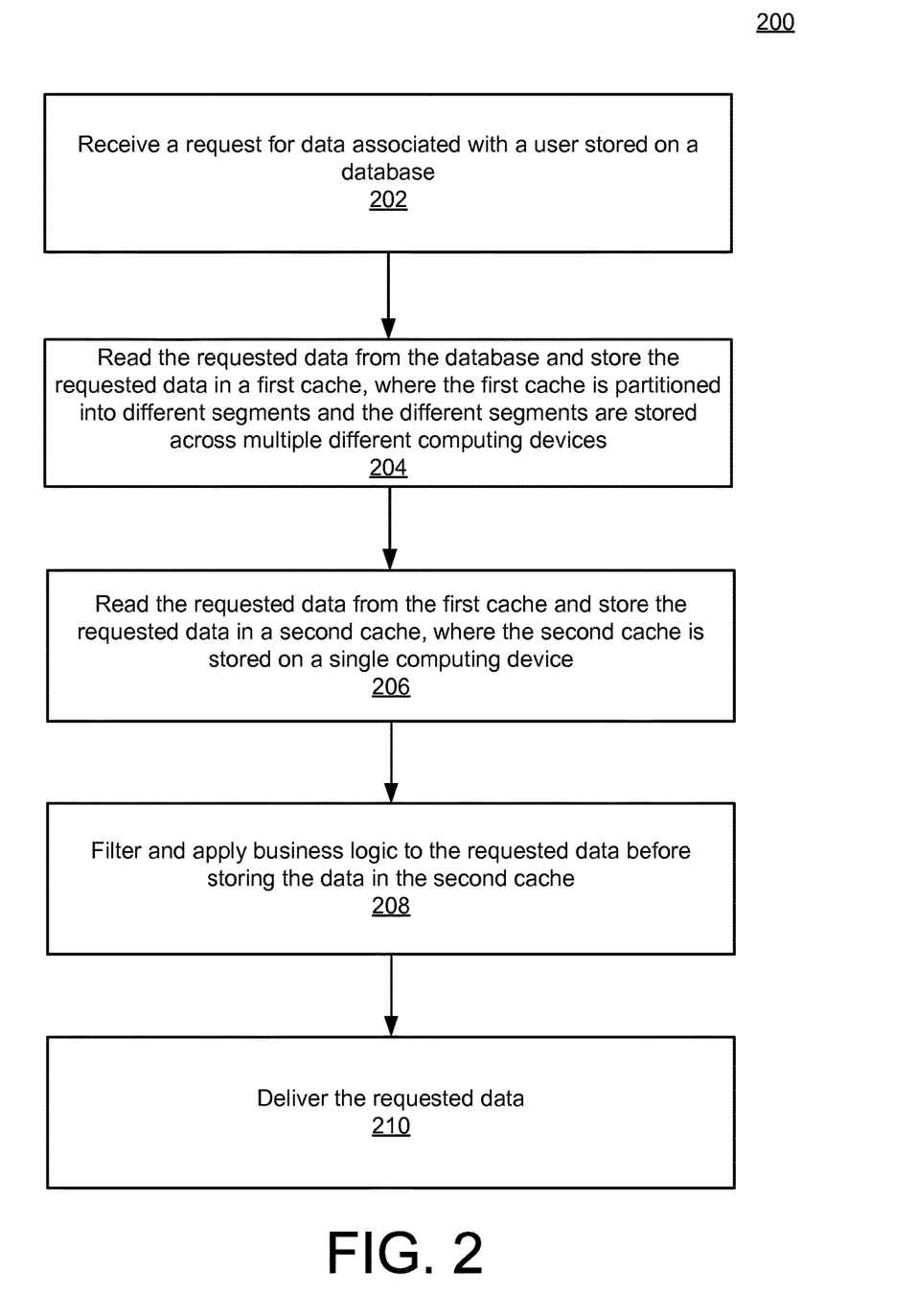
FIG. 2 is an example flowchart illustrating example operations of the system of FIG. 1.

Referring to FIG. 2, an example flowchart illustrates a process 200 for example operations of the system 100 of FIG. 1. Process 200 includes receiving a request for data associated with a user stored on a database (202). For example, the business object layer 116 is configured to receive a request for data associated with a user 108 stored on a database 102 (202). The request for data may be received over one of multiple channels including a web service 112 channel and a struts actions 114 channel.

The data is not provided to the user directly from the database 102. Instead, process 200 includes reading the requested data from the database and storing the requested data in a first cache, where the first cache is partitioned into different segments and the different segments are stored across multiple different computing devices (204). For example, the distributed cache 104 (also referred to as the first cache) reads the requested data from the database 102 and stores the data in the distributed cache 104. The distributed cache 104 is partitioned into different segments and the different segments are stored across multiple different computing devices (204). For instance, the distributed cache 104 may be implemented on multiple different servers and the distributed cache on one server may be backed up on a different server.

Process 200 includes reading the requested data from the first cache and storing the requested data in a second cache, where the second cache is stored on a single computing device (206). For example, the local cache 106 (also referred to as the second cache) reads the data from the distributed cache 104 and stores the requested data in the local cache 106. The local cache 106 is stored on a single computing device (206). The local cache 106 is located on the computing device that received the request for the data.

Process 200 includes filtering and applying business logic to the requested data before storing the data in the second cache (208). For example, the business object layer 116 is configured to filter the data and apply business logic to the data before the data is stored in the local cache 106 (208). For instance, the business object layer 116 may apply authentication and/or access rules to ensure that the user requesting the data is provided only data that the user is authorize to receive. The data also may be formatted for storage in the local cache 106 such that the data may be filtered, sorted and searched by the user.

Process 200 includes delivering the requested data (210). For example, the local cache 106 may deliver the requested data to the user 108 using the client computing device 110. The requested data may be displayed for the user and, as discussed above, the user may manipulate the data stored in the local cache 106 to include sorting, paging, filtering and searching.

The process described above also may include other optional processes. For example, subsequent requests for data associated with the user may be received. The business object layer 116 may receive subsequent requests for data from the user 108 through the user computing device 110. The local cache 106 is first checked to see if the subsequent requests can be fulfilled and delivered with the data already populated in the local cache 106 without having to check the distributed cache 104 or the database 102. If the local cache 106 contains the data, then the data is delivered from the local cache 106. If the data is not contained in the local cache 106, then the distributed cache 104 is checked to see if it contains the data. If the distributed cache 104 contains the data, then the data is delivered from the distributed cache 104 to the local cache 106 and then to the user. If the distributed cache 104 does not contain the data, then the distributed cache 104 reads the data from the database 102 and the local cache 106 then reads the data from the distributed cache 104 and the local cache 106 delivers the data to the user.

In one implementation, the original request for data may be received using a first channel and the subsequent requests for the data may be received using a second channel, where the first channel is a different channel than the second channel. For example, the original request for data may be received by the business object layer 116 through a web service 112 channel. The data may be read from the database 102 and stored in the distributed cache 104 and then read from the distributed cache 104 and stored in the local cache 106. A subsequent request for the data may be received by the business object layer 116 through a struts actions 114 channel and the data may be read directly from the local cache 106. In this manner, it does not matter that the data was originally requested using one channel and then later requested using a different channel. The same data may still be read from the local cache 106.

In another implementation, the process may include receiving data input as part of a transaction having multiple data entries. For example, the user may initiate a transaction that includes inputting data into the system 100 for storage of the data and performance of the transaction. In one context, the user may enter data as part of a banking transaction where the transaction includes multiple data entries. The business object layer 116 receives the data input as part of the transaction.

The process includes storing the multiple entries in the first cache until a submission signal is received. For example, the entries received by the business object layer 116 may be stored in the distributed cache 104 until such time that a submission signal is received, which indicates that the transaction is complete. The data is persistent in the distributed cache 104 and remains stored in the distributed cache 104 at least until the transaction is complete and all of the entries have been entered.

In response to receipt of the submission signal, the transaction is stored in the database 102. Thus, upon receipt of the submission signal the data is read from the distributed cache 104 and written to the database 102. In one implementation, the data entries for the transaction may be received from multiple different channels. That is, the user may enter a portion of the transaction through the web service 112 channel and another part of the transaction through the struts actions 114 channel. The data is saved and stored in the distributed cache 104 at least until the submission signal is received and the transaction is committed to the database 102.

In the event of an interruption during the data entry, the data is saved in the distributed cache 104 and entry can continue after the interruption is resolved. Also, the data entered into the distributed cache 104 is backed up so in the event of a failure of one distributed cache 104 the data is still saved in the back up distributed cache 104.

Figure 3:
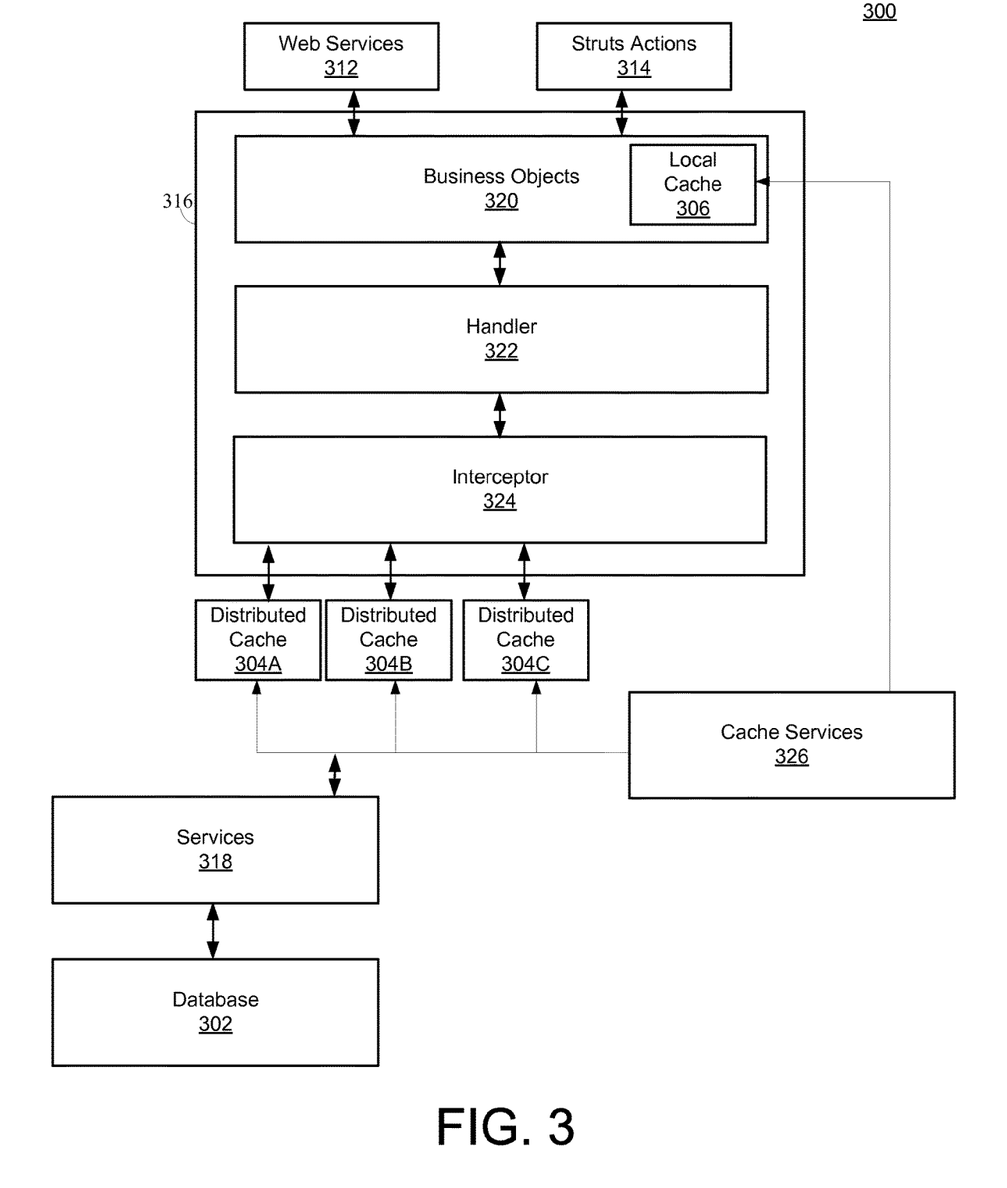
FIG. 3 is an example block diagram of a system for a distributed cache network.

FIG. 3 is an example block diagram of a system 300 for a distributed cache framework. The system 300 includes the same features and functionality of the system 100 of FIG. 1 as described above. The system 300 includes database 302, web services 312, strut actions 314, business object layer 316 and services 318. The database 302 may include the same features and functionality as the database 102 of FIG. 1. The web services 312 and the strut actions 314 have the same features and functionality of the web services 112 and the strut actions 114 of FIG. 1. The business object layer 316 includes the same features and functionality as the business object layer 116 of FIG. 1. The services modules 318 includes the same features and functionality as the BPTW server 118 of FIG. 1.

The business objects layer 316 includes business objects 320, handler 322 and interceptor 324. The local cache 306 is included as part of the business objects layer 316. The business objects 320 may be configured to filter the data and apply business logic to the data prior to the data being written to the local cache 306. The handler 322 may be used to manage a user's entitlements to the data and to manage cache invalidation when the entitlements change. For example, when a user's entitlements change, the user's local cache is invalidated. The handler 322 notifies the local cache 306 or other external entities of entitlement changes and may enforce one or more application programming interfaces (APIs) related to the notifying the local cache 306 of changes related to the user's cache. The cache invalidations may take place immediately on the node (or server) where entitlement changes take place. Other nodes may be notified of the changes, as well.

The interceptor 324 is configured to intercept the data requests from the user. The interceptor 324 interacts with the distributed cache 304A-304C and handles caching at the service layer. The interceptor 324 may invoke one or more methods that intercept calls and requests for data. The interceptor 324 has a handle to cache services 326.

In the system 300, multiple segments of the distributed cache 304A-304C are illustrated. As discussed above, the distributed cache may be partitioned into multiple segments and the multiple segments are distributed and stored on multiple different computing devices.

In the system 300 of FIG. 3, the cache services 326 is illustrated. The cache services 326 may function as a central point of contact to the caching framework. The cache services 326 allows a cache to be created, removed, read and modified through the cache services 326. The cached services 326 controls the distributed cache 304A-304C and the local cache 306. All operations on a particular cache are submitted to the cache services 326. Each cache includes a unique identifier associated with itself on a cluster node (or server). The cache internally may use Hazelcast distributed map to maintain a single view of data across the cluster.

Figure 4:
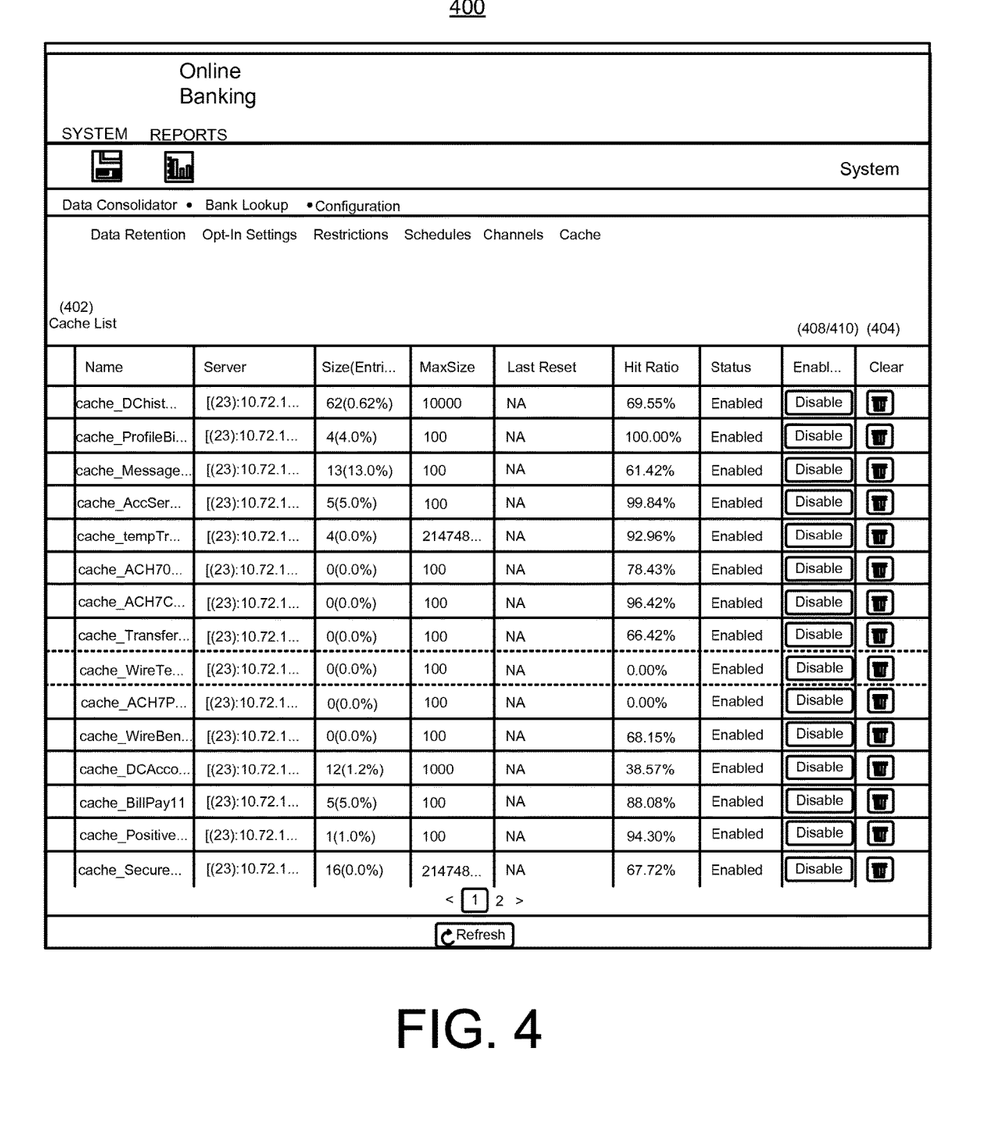
FIG. 4 is an example screen shot of a cache management user interface.

Referring to FIG. 4, an example screen shot illustrates a cache management user interface 400. The user interface 400 may be displayed on one or more of the nodes (or servers). The user interface 400 provides an interface for a user to interact with the cache services to perform one or more user-initiated actions on the distributed cache and the local cache. For instance, the user interface 400 enables a user to enable or disable a cache, clear a cache and display cache statistics.

For example, as illustrated in the example user interface 400, a cache list 402 is provided, where the cache list includes a list of all of the caches currently being monitored by the cache services. The cache list 402 provides information about each of the caches including the server the cache is located on, the size of the cache, the maximum size of the cache, the last reset, the hit ratio and the status. The status indicates whether the cache is enabled or disabled. There are interactive features that allow a user to clear a cache (404) and to enable (408) or disable (410) the cache. This single management interface allows an administrative user to control the operations of all of the caches including the distributed caches and the local caches.

Figure 5:
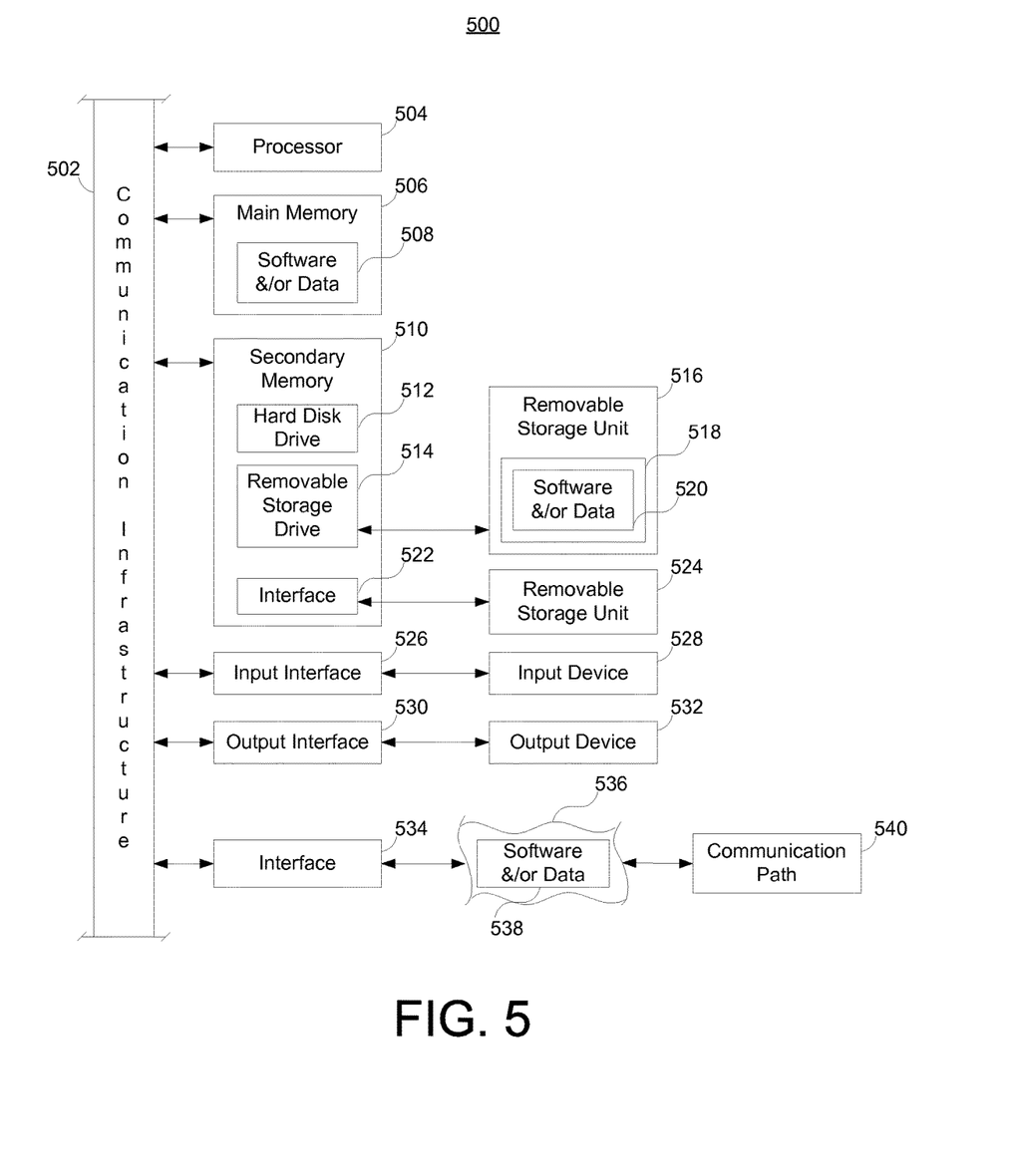
FIG. 5 is an example block diagram of an example computer system.

Aspects of the above can be implemented by software, firmware, hardware, or any combination thereof. Referring to FIG. 5, an example block diagram illustrates an example computer system 500 in which the above, or portions thereof, may be implemented as computer-readable code. Various embodiments of the above are described in terms of this example computer system 500. After reading this description, it will become apparent to a person skilled in the relevant art how to implement the invention using other computer systems and/or computer architectures.

Computer system 500 includes one or more processors, such as processor 504. Processor 504 can be a special purpose processor or a general purpose processor. Processor 504 is connected to a communication infrastructure 502 (for example, a bus or a network).

Computer system 500 also includes a main memory 506, preferably Random Access Memory (RAM), containing possibly inter alia computer software and/or data 508.

Computer system 500 may also include a secondary memory 510. Secondary memory 510 may include, for example, a hard disk drive 512, a removable storage drive 514, a memory stick, etc. A removable storage drive 514 may comprise a floppy disk drive, a magnetic tape drive, an optical disk drive, a flash memory, or the like. A removable storage drive 514 reads from and/or writes to a removable storage unit 516 in a well-known manner. A removable storage unit 516 may comprise a floppy disk, magnetic tape, optical disk, etc. which is read by and written to by removable storage drive 514. As will be appreciated by persons skilled in the relevant art(s) removable storage unit 516 includes a computer usable storage medium 518 having stored therein possibly inter alia computer software and/or data 520.

In alternative implementations, secondary memory 510 may include other similar means for allowing computer programs or other instructions to be loaded into computer system 500. Such means may include, for example, a removable storage unit 524 and an interface 522. Examples of such means may include a program cartridge and cartridge interface (such as that found in video game devices), a removable memory chip (such as an Erasable Programmable Read-Only Memory (EPROM), or Programmable Read-Only Memory (PROM)) and associated socket, and other removable storage units 524 and interfaces 522 which allow software and data to be transferred from the removable storage unit 524 to computer system 500.

Computer system 500 may also include an input interface 526 and a range of input devices 528 such as, possibly inter alia, a keyboard, a mouse, etc.

Computer system 500 may also include an output interface 530 and a range of output devices 532 such as, possibly inter alia, a display, one or more speakers, etc.

Computer system 500 may also include a communications interface 534. Communications interface 534 allows software and/or data 538 to be transferred between computer system 500 and external devices. Communications interface 534 may include a modem, a network interface (such as an Ethernet card), a communications port, a Personal Computer Memory Card International Association (PCMCIA) slot and card, or the like. Software and/or data 538 transferred via communications interface 534 are in the form of signals 536 which may be electronic, electromagnetic, optical, or other signals capable of being received by communications interface 534. These signals 536 are provided to communications interface 534 via a communications path 540. Communications path 540 carries signals and may be implemented using wire or cable, fiber optics, a phone line, a cellular phone link, a Radio Frequency (RF) link or other communications channels.

As used in this document, the terms "computer program medium," "computer usable medium," and "computer readable medium" generally refer to media such as removable storage unit 516, removable storage unit 524, and a hard disk installed in hard disk drive 512. Computer program medium and computer usable medium can also refer to memories, such as main memory 506 and secondary memory 510, which can be memory semiconductors (e.g. Dynamic Random Access Memory (DRAM) elements, etc.). These computer program products are means for providing software to computer system 500.

Computer programs (also called computer control logic) are stored in main memory 506 and/or secondary memory 510. Computer programs may also be received via communications interface 534. Such computer programs, when executed, enable computer system 500 to implement the present invention as discussed herein. In particular, the computer programs, when executed, enable processor 504 to implement the processes of aspects of the above. Accordingly, such computer programs represent controllers of the computer system 500. Where the invention is implemented using software, the software may be stored in a computer program product and loaded into computer system 500 using removable storage drive 514, interface 522, hard drive 512 or communications interface 534.

The invention is also directed to computer program products comprising software stored on any computer useable medium. Such software, when executed in one or more data processing devices, causes data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, Compact Disc Read-Only Memory (CD-ROM) disks, Zip disks, tapes, magnetic storage devices, optical storage devices, Microelectromechanical Systems (MEMS), nanotechnological storage device, etc.), and communication mediums (e.g., wired and wireless communications networks, local area networks, wide area networks, intranets, etc.).

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a database that is configured to store data on one or more memory devices;
a business object layer that is configured to receive a request for data associated with a user stored on the database;
a first cache that is operably coupled to the database and that is configured to read and store the requested data from the database in response to the request from the business object layer, wherein the first cache is partitioned into different segments and the different segments are stored across multiple different computing devices; and
a second cache that is operably coupled to the first cache and that is configured to read and store the requested data only from the first cache and not the database, wherein:
the business object layer is configured to filter and apply business logic to the data before the second cache reads the requested data from the first cache,
the second cache is stored on a single computing device that received the request,
the business object layer is configured to deliver the requested data from the second cache,
the business object layer is configured to receive subsequent requests for the data associated with the user, wherein the request and the subsequent requests are received from at least two different channels,
the business object layer is configured to read the requested data from the second cache and deliver the requested data in response to the subsequent requests without accessing the requested data from the database,
the business object layer receives data input from the user as part of a transaction having multiple data entries, wherein the multiple entries for the transaction are received from at least two different channels, and
the first cache is configured to store the multiple entries until a submission signal is received and the entries are stored in the database.

2. The system of claim 1 wherein the second cache is configured to sort, search and filter the requested data in response to sort, search and filter requests.

3. The system of claim 1 wherein the second cache is part of the business object layer.

4. The system of claim 1 wherein:
the business object layer is configured to receive the request for the data associated with the user, wherein the user is associated with an entity; and
the first cache is configured to read and store the requested data from the database, wherein a portion of the requested data is common to multiple users associated with the entity.

5. The system of claim 1 wherein the requested data stored in the second cache is deleted after a configurable period of time.

6. The system of claim 1 wherein the requested data stored in the first cache is stored for a longer period of time than the requested data stored in the second cache.

7. The system of claim 1 further comprising a cache service module that is operably coupled to the first cache and to the second cache, wherein the cache service module is configured to control operations of the first cache and the second cache including computing cache statistics for delivery in response to a request for cache statistics.

8. The system of claim 1 wherein:
the first cache uses a distributed map to store the requested data across the multiple different computing devices; and
the second cache uses local memory of the single computing device that received the request.

9. The system of claim 1 wherein the first cache and the second cache using a locking and notification mechanism to maintain data synchronization between the first cache, the second cache and the database.

10. A computer-implemented method for executing instructions stored on a non-transitory computer-readable storage medium, the method comprising:
- receiving a request for data associated with a user stored on a database;
- reading the requested data from the database and storing the requested data in a first cache, wherein the first cache is partitioned into different segments and the different segments are stored across multiple different computing devices;
- reading the requested data from the first cache and storing the requested data in a second cache, wherein the second cache is stored on a single computing device and the second cache is configured to read the requested data only from the first cache and not from the database;
- filtering and applying business logic to the requested data before storing the data in the second cache;
- delivering the requested data;
- receiving subsequent requests for the data associated with the user on a different channel than a channel on which the request for data was received;
- reading the requested data from the second cache;
- delivering the requested data in response to the subsequent requests without accessing the data from the database;
- receiving data input as part of a transaction having multiple data entries from at least two different channels;
- storing the multiple entries in the first cache until a submission signal is received; and
- storing the transaction in the database in response to receipt of the submission signal.

11. The method as in claim 10 wherein the requested data stored in the second cache is deleted after a configurable period of time.

12. The method as in claim 10 wherein the requested data stored in the first cache is stored for a longer period of time than the requested data stored in the second cache.

13. The method as in claim 10 wherein:
- the first cache uses a distributed map to store the requested data across the multiple different computing devices; and
- the second cache uses local memory of the single computing device that received the request.

14. The method as in claim 10 wherein the first cache and the second cache using a locking and notification mechanism to maintain data synchronization between the first cache, the second cache and the database.

15. A computer program product, the computer program product being tangibly embodied on a non-transitory computer-readable storage medium and comprising instructions that, when executed, are configured to cause at least one processor to:
- receive a request for data associated with a user stored on the database;
- read the requested data from the database and store the requested data in a first cache, wherein the first cache is partitioned into different segments and the different segments are stored across multiple different computing devices;
- read the requested data from the first cache and store the requested data in a second cache, wherein the second cache is stored on a single computing device and the second cache is configured to read the requested data only from the first cache and not from the database;
- filter and apply business logic to the requested data before storing the data in the second cache;
- deliver the requested data;
- receive subsequent requests for the data associated with the user on a different channel than a channel on which the request for data was received;
- read the requested data from the second cache;
- deliver the requested data in response to the subsequent requests without accessing the data from the database;
- receive data input as part of a transaction having multiple data entries from at least two different channels;
- store the multiple entries in the first cache until a submission signal is received; and
- store the transaction in the database in response to receipt of the submission signal.

16. The computer program product of claim 15 wherein the requested data stored in the second cache is deleted after a configurable period of time.

17. The computer program product of claim 15 wherein the requested data stored in the first cache is stored for a longer period of time than the requested data stored in the second cache.

18. The computer program product of claim 15 wherein:
- the first cache uses a distributed map to store the requested data across the multiple different computing devices; and
- the second cache uses local memory of the single computing device that received the request.

19. The computer program product of claim 15 wherein the first cache and the second cache using a locking and notification mechanism to maintain data synchronization between the first cache, the second cache and the database.

* * * * *